United States Patent [19]

Cretors

[11] 4,206,695

[45] Jun. 10, 1980

[54] CORN POPPING APPARATUS WITH SPRING POWERED DISCHARGE

[75] Inventor: Charles D. Cretors, Lake Forest, Ill.

[73] Assignee: C. Cretors and Company, Chicago, Ill.

[21] Appl. No.: 936,907

[22] Filed: Aug. 25, 1978

[51] Int. Cl.² ............................................. A23L 1/18
[52] U.S. Cl. .................................................. 99/323.9
[58] Field of Search ................ 99/323.4, 323.5, 323.9, 99/323.8, 323.11, 323.7, 348; 188/266; 267/124, 171, 172, 173; 74/520, 97; 220/335, 334; 222/498; 200/73, 67 A, 153 G; 366/45, 47, 189

[56] References Cited

U.S. PATENT DOCUMENTS

| | | | |
|---|---|---|---|
| 1,501,114 | 7/1924 | Howe | 99/323.4 |
| 1,711,918 | 5/1929 | Burch | 99/323.4 |
| 1,961,812 | 6/1934 | Burch | 99/323.4 |
| 2,134,682 | 11/1938 | Burch | 99/323.4 |
| 2,654,823 | 10/1953 | Altemiller | 99/323.5 |
| 2,856,841 | 10/1958 | Cretors | 99/323.5 |
| 2,984,169 | 5/1961 | Bushway | 99/323.9 |
| 3,095,326 | 6/1963 | Green | 99/323.8 |
| 3,739,710 | 6/1973 | Costa | 99/348 |
| 4,106,118 | 8/1978 | Hoover | 99/348 |

*Primary Examiner*—Robert W. Jenkins
*Attorney, Agent, or Firm*—Neuman, Williams, Anderson & Olson

[57] ABSTRACT

A corn popping apparatus is provided including a mechanism for maintaining a popcorn pan in one of two stable positions, a cooking position and a discharge position, and for assisting in the movement of the pan from one position to the other. The mechanism is powered by a compression spring and includes a piston to provide a controlled return rate. A linkage is provided which serves to pivotally connect the popcorn pan to a frame. The linkage allows the pan to swing from a substantially horizontal position to a substantially vertical position down and away from the pan cover so that the top of the pan is completely open to discharge its contents without significant effort on the part of the operator.

3 Claims, 3 Drawing Figures

CORN POPPING APPARATUS WITH SPRING POWERED DISCHARGE

FIELD OF THE INVENTION

This invention relates to improvements in corn popping apparatus. More specifically, it relates to an improvement in corn popping apparatus that provides a simple, easy to operate and economical corn popper.

BACKGROUND OF THE INVENTION

Corn popping apparatus of various designs are widely used in the popcorn industry. The state of the art to which this invention pertains is illustratively represented by the following United States patents: U.S. Pat. Nos. 2,549,449 issued to L. C. Gibson on Apr. 17, 1951; 2,586,347 issued to Kloster on Feb. 19, 1952; 2,654,823 issued to A. D. Altemiller on Oct. 6, 1953; and 3,095,326 issued to J. Green on June 25, 1963.

As is well known to those skilled in the popcorn making art, it is desirable to quickly discharge the popped corn from the popcorn pan after it has been popped to avoid burning of the popped corn, and to return the pan to its cooking position for another cooking sequence. As typified by the above-mentioned patents, automated corn popping apparatus include a pan or container that may be moved from a cooking position to a position whereby the contents therein are discharged. Such apparatus often require the exertion of significant physical force on the part of the operator to rotate or move the pan from the cooking position to the discharge position and back to the cooking position. This results in operator fatigue and a consequential loss in efficiency. In order to obviate this problem, weights, counterbalancing means, and pneumatic devices have been employed to more easily effect the required movement. Such systems have been cumbersome, expensive and inefficient.

Another disadvantage of the prior systems was the use of a latch to secure the pan in the cooking position. These latches, in addition to increasing the overall cost of the popping system, also had the disadvantage of having a short useful life relative to that of other components of the system. Other attempts to resolve the aforementioned problems involved the use of magnets to retain the pan in its cooking position. These systems were also unreliable, inefficient and expensive to manufacture, maintain and operate.

SUMMARY OF THE INVENTION

It is a general object of this invention to provide an improved corn popping apparatus which overcomes the problems besetting prior popping systems.

It is a specific object of this invention to provide a corn popping apparatus that is simple, easy to operate, reliable, efficient, durable, inexpensive, and easy to clean.

It is another specific object of this invention to provide a corn popping apparatus that is self-latching.

It is still another specific object of this invention to provide a corn popping apparatus which allows the use of larger, heavier pans while substantially obviating the requirement on the part of the operator to physically exert significant force to lift the pan of the apparatus from a discharge position back to a cooking position.

Other objects and advantages of the present invention will become apparent upon reading the detailed description set forth below, together with the appended claims, and with reference to the accompanying drawings.

In carrying out the invention in one form, a corn popping apparatus is provided which includes a frame, a container for popping corn, and a means for mounting the container on the frame for movement between a first stable popping position and a second stable discharge position. A spring connecting means is provided for assisting in the movement of the container from one position to the other. The spring connecting means is pivotally connected to the container in such a way as to hold it in either the popping position or the discharge position. Notwithstanding the fact that the positions are stable positions, the spring connecting means assists in the movement of the container from one position to the other without the necessity of a significant amount of physical force on the part of an operator.

While the invention will be described in connection with certain preferred embodiments, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
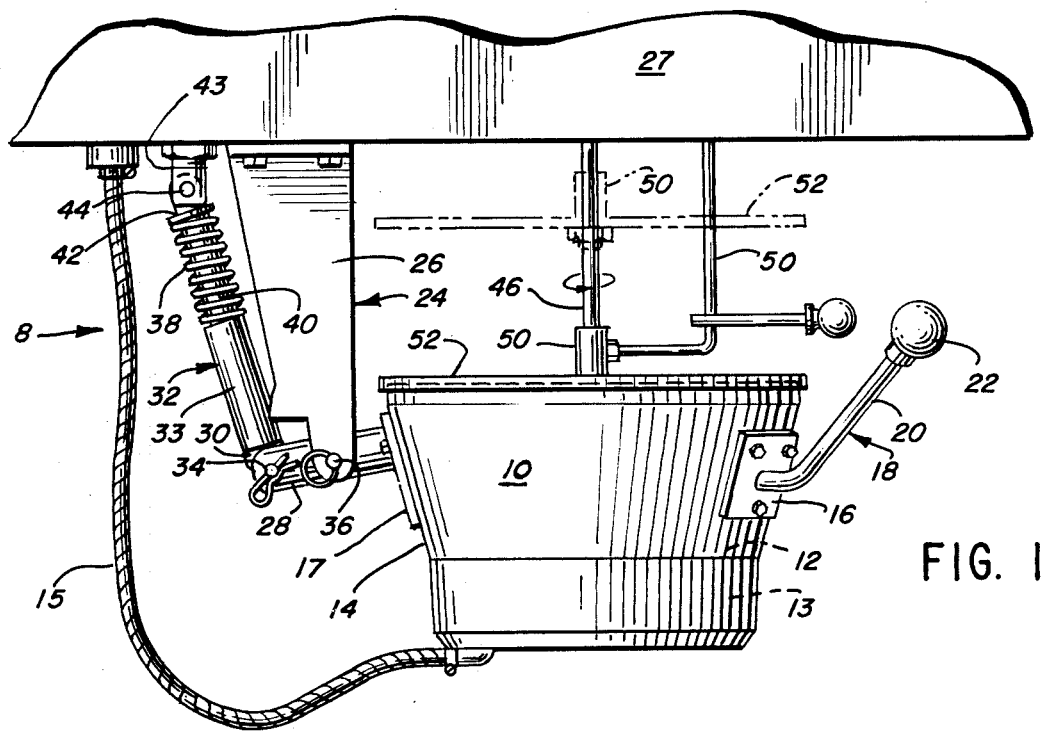
FIG. 1 is a side elevational view of a corn popping apparatus employing the principles of this invention in a retaining position.
Figure 2:
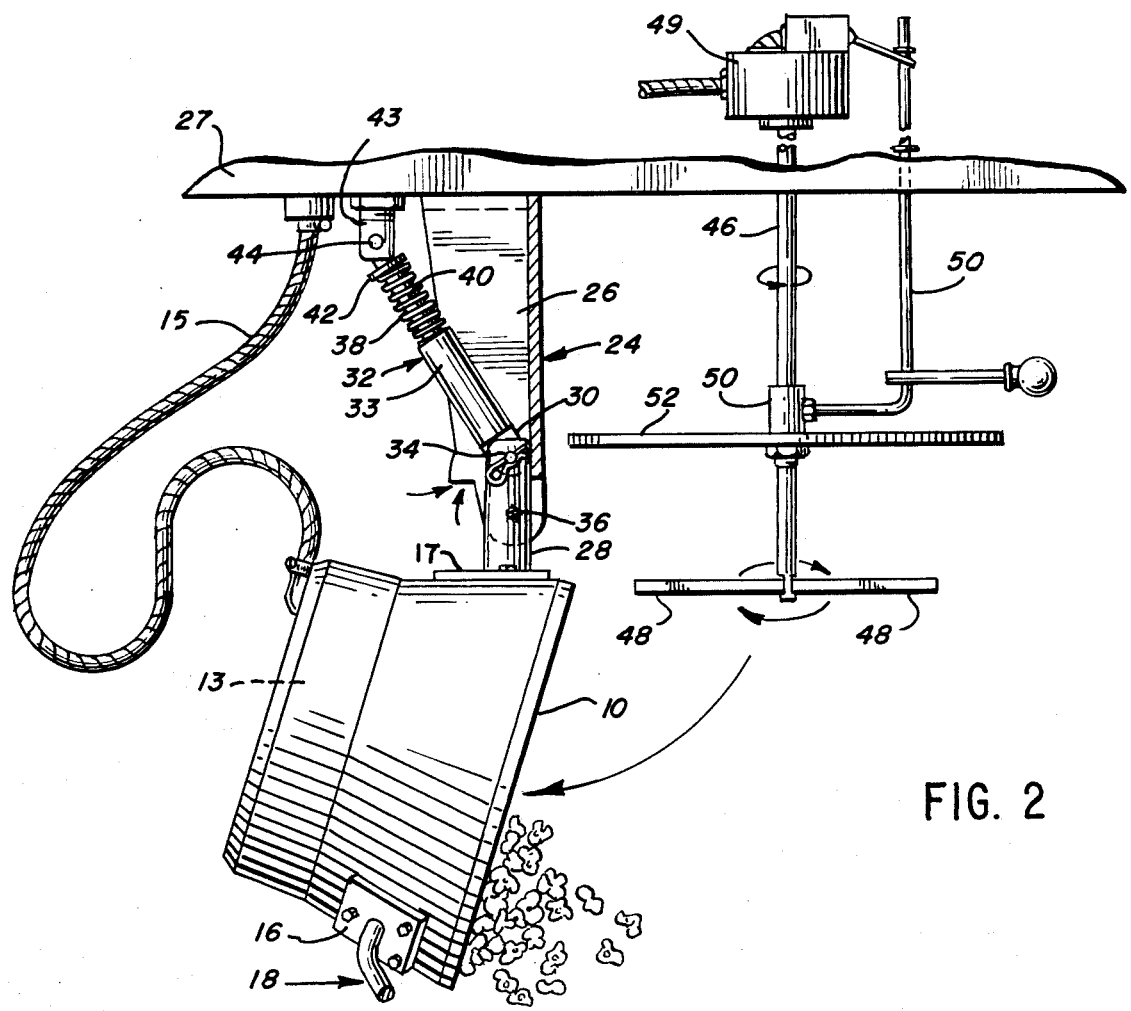
FIG. 2 is a side elevational view of the corn popping apparatus of FIG. 1 in a discharge position.
Figure 3:
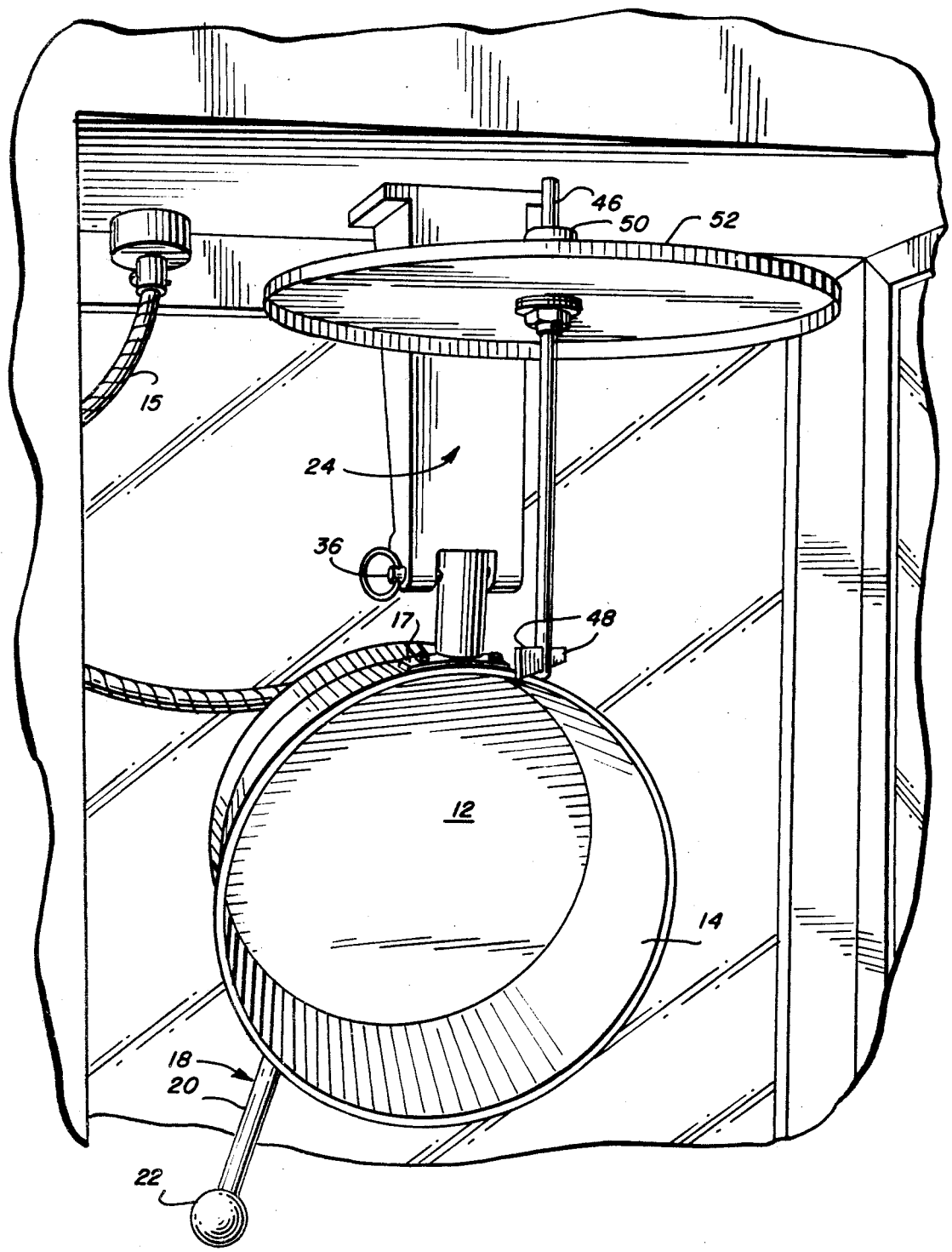
FIG. 3 is a perspective view of the corn popping apparatus of FIG. 2.

A corn popping apparatus constructed in accordance with the principles of this invention is shown in FIGS. 1-3. FIG. 1 depicts the apparatus 8 in a cooking position. FIGS. 2 and 3 depict the apparatus 8 in a discharge position. As shown in FIG. 1, a generally circular container or popper pan 10 is provided and has a disc-shaped imperforate preferably metallic base 12 from which an annular, preferably metallic strip, extends to provide a retaining wall 14. A heating element 13 is built into the base 12 of the pan 10. An electric cord 15 is attached to the heating element and adapted to be plugged into an appropriate electrical receptacle. The heating element 13, in and of itself, forms no part of the invention. Many different types of heat sources may be used without departing from the scope of this invention.

Affixed to the wall 14 of the popper pan 10 are plates 16 and 17. Handle 18 is suitably mounted on plate 16 and includes an elongated member 20 which engages the plate 16 at its proximal end and is terminated by a sphere 22 at its distal end. The popper pan 10 is supported by a spring-loaded support mechanism 24. The support mechanism 24 is in turn suitably mounted on frame 27. The support mechanism 24 includes a pivot arm 28, a dashpot 32, and a spring 38. Dashpot 32 includes a cylinder 33 and an elongate shaft 40 which extends into cylinder 33 in a manner well known in the art. One end of the pivot arm 28 is secured to plate 17 on the popper pan 10 and the other end is pivotally connected to an extension 30 from the dashpot 32 by a rivet 34. The pivot arm 28 is also pivotally attached between its ends to the bracket 26 by a pin 36. Pin 36 is removable to allow for the ready and easy removal and cleaning of the popper pan 10.

The pivot arm 28 is held in a substantially horizontal or a substantially vertical alignment by the moment created about the pin 36 by a spring 38 acting through a dashpot 32. A preferred embodiment is shown here utilizing a dashpot, however, it is well within the scope of this invention to utilize a pneumatic piston, a pneumatic-hydraulic piston, or a gas filled spring. Also, it is within the invention to use a spring alone without a damping mechanism such as a piston or a gas filled spring.

Spring 38 is disposed about elongate shaft 40 between retaining ring 42 and the top of cylinder 33. The shaft 40 is pivotally connected by pin 44 to an arm 43 which is secured to frame 27. The expansive force of the spring 38 creates a moment about the pin 36 which is greater than the counteracting moments created by the weight of the pan 10. Thus, the arrangement is self-latching in that it provides for the retention of the pan 10 in a horizontal position without the necessity for a latch to hold the pan in place.

As shown in FIGS. 1 and 2, a shaft 46 is suspended from the frame 27. The shaft 46 is coaxially aligned with the popper pan 10. At the lower end of the shaft 46 are blades 48. The upper end of the shaft 46 is attached to a suitable drive mechanism 49 for rotating blades 48 to stir the corn in a manner well known in the art. A popper pan cover 52 is coaxially attached to shaft 46 by bracket 50. The cover 52 may be moved vertically along shaft 46 for both loading uncooked corn and discharging popped corn.

A typical popping operation will now be described. Popping cover 52 is vertically raised along shaft 46 and kernels of corn are then placed in pan 10. Cover 52 is then slid down on the pan 10. The heating element 13 and the agitator drive shaft 46 are suitably energized, whereupon the kernels are heated and agitated. Cover 52 is slidably mounted on the shaft 46 so as to be free to move upwardly as the pan 10 overflows with popped popcorn.

After the corn has been substantially popped, the pan 10 is moved to the discharge position by the exertion of a relatively slight downward force on the handle 18. This causes clockwise moment about the pin 36, see FIG. 1. When this clockwise moment exceeds the counterclockwise moment about the pin 36, due to the force of the spring 38, the pivot arm 28 rotates clockwise and pushes the extension 30 of the dashpot 32 upwardly. It can be seen that as the pan 10 swings downwardly, the dashpot 32 moves up and compresses the spring 38. Compression of the spring 38 continues until the pivot arm 28, the dashpot 32, the spring 38 and the shaft 40 become rectilinear. At this point, the point of engagement 34 of the pivot arm 28 and the extension 30 begins to move away from the spring 38 thereby allowing the spring to expand. The expansion of the spring 38 will subsequently act to exert a clockwise force on the pivot arm 28 which will cause it to move to a point of abutting engagement with the bracket 26. The resultant position of the pan is shown in FIG. 2.

Similarly, when the handle 18 is urged to the right from the position shown in FIG. 2, the spring 38 undergoes a momentary compression and thereafter acts about the pin 36 to urge the pan in an upward direction. The upward movement of the pan is limited by the maximum extended length of the dashpot and spring assembly. The piston 32 provides a controlled return rate and operates to damp undesirable oscillations arising whenever the apparatus moves from one position to the other.

It is apparent that with the exception of a minimal urging by the operator to initiate movement, the apparatus 8 provides for automatic return of the popcorn pan to the horizontal retaining position.

Thus, a simple and inexpensive apparatus is provided that effectively provides for the popping and discharging of popcorn while requiring little force to operate, which is durable, reliable and efficient.

What is claimed is:

1. An apparatus comprising:
   a frame;
   a container for retaining discrete particles;
   means mounting said container on said frame for assisting movement between and retaining said container in a first stable position for maintaining said particles and a second stable position for discharging said particles, said mounting means including a connecting means having a first bracket attached to said frame, a shaft having one end pivotally connected to said first bracket and having another end disposed within a cylinder, an arm having a first end pivotally secured to said cylinder and having a second end secured to said container, and a second bracket attached to said frame and pivotally secured to said arm between said first and second ends to provide a pivot point;
   whereby said container is free to rotate under the influence of said connecting means about said pivot point from said first stable position to said second stable position and from said second stable position to said first stable position requiring minimal effort on the part of the operator.

2. A corn popping apparatus comprising:
   a frame;
   a container for retaining kernels of corn;
   means mounting said container on said frame for assisting movement between and retaining said container in a first stable position for maintaining said kernels and a second stable position for discharging said kernels, said mounting means including a connecting means having a first bracket attached to said frame, a shaft having one end pivotally secured to said cylinder, an arm having a first end pivotally secured to said cylinder and having a second end secured to said container, and a second bracket attached to said frame and pivotally secured to said arm between said first and second ends to provide a pivot point;
   whereby said container is free to rotate under the influence of said connecting means about said pivot point from said first stable position to said second stable position and from said second stable position to said first stable position requiring minimal effort on the part of the operator.

3. The apparatus of claim 1 or 2 wherein said cylinder is a spring means.

* * * * *